April 30, 1957  F. MARICH  2,790,294
ROTATING CUTTING REEL FOR LAWN MOWER
Filed July 19, 1955  2 Sheets-Sheet 1

INVENTOR.
FREDERICK MARICH
BY *John H. Slocum*
ATTORNEY

April 30, 1957  F. MARICH  2,790,294
ROTATING CUTTING REEL FOR LAWN MOWER
Filed July 19, 1955  2 Sheets-Sheet 2
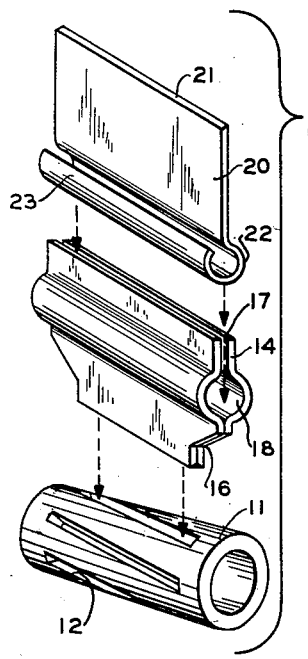
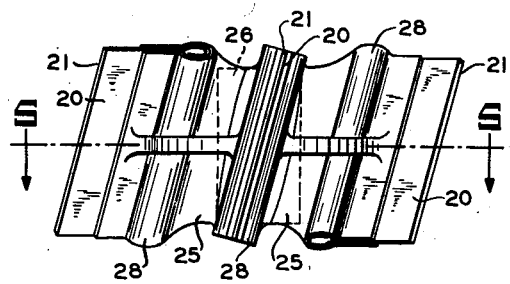
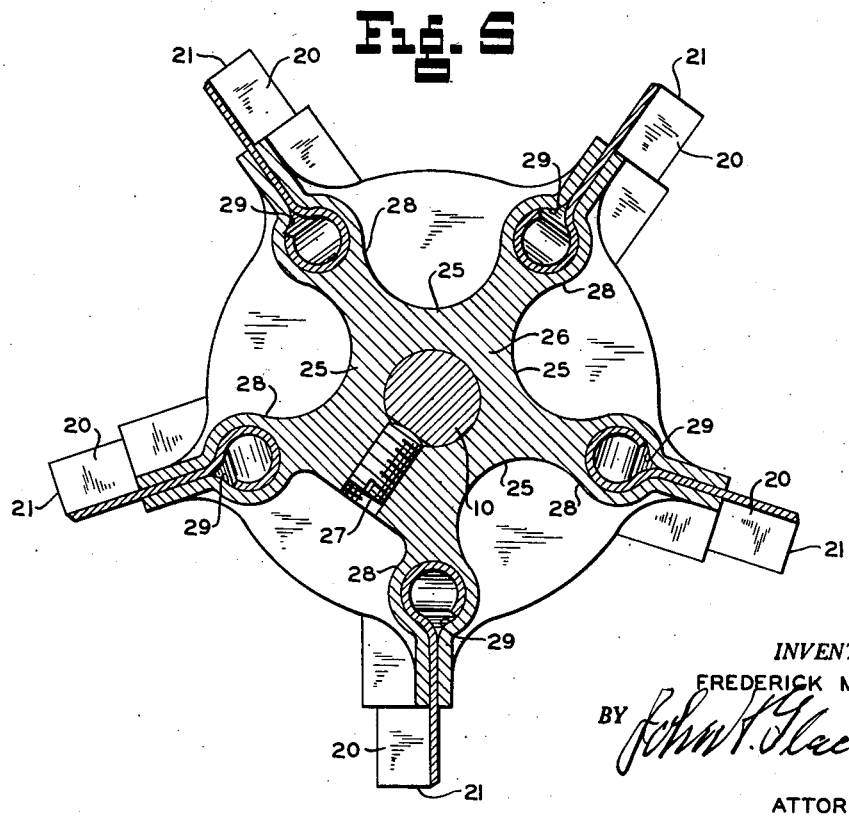
INVENTOR.
FREDERICK MARICH
BY
ATTORNEY

United States Patent Office 2,790,294
Patented Apr. 30, 1957

2,790,294
ROTATING CUTTING REEL FOR LAWN MOWER

Frederick Marich, New York, N. Y.

Application July 19, 1955, Serial No. 522,931

3 Claims. (Cl. 56—294)

This invention relates to lawn mowers and more particularly to the type of blades used in the mower and the manner of positioning said blades.

The conventional lawn mower today uses one fixed blade and a plurality of curved rotating blades which cooperate with the fixed blade to cut the grass. The conventional mower is definitely limited in the height of the grass it can cut since it has a tendency to jam where the grass is too high.

An object of the present invention is to provide a mower wherein each row of blades is set at an angle and where a plurality of blades instead of a single curved one is placed in each row with each of the blades in a row slightly overlapping the one next to it. This results in a far more efficient machine which can handle higher grass and which does not have a tendency to jam since each individual blade tends to draw any surplus grass into its companion blade.

Lawn mowers employing the basic idea of the plurality of blades have been known in the prior art. However, these have been expensive to construct and maintain because each individual blade was riveted to a rather complicated collar by at least two rivets or bolts. It is one of the objects of this invention to provide an assembly which can be economically made and in which the blades may be simply and quickly inserted.

Other objects and advantages of the invention will appear from the following description and the accompanying drawings.

In the drawings—

Fig. 3 is an exploded view showing the hub of one blade holder and one blade.

Fig. 4 is a plan view of a modified blade holder and blade.

Fig. 5 is an enlarged sectional view taken on the line 5—5 of Fig. 4.

Figure 1:
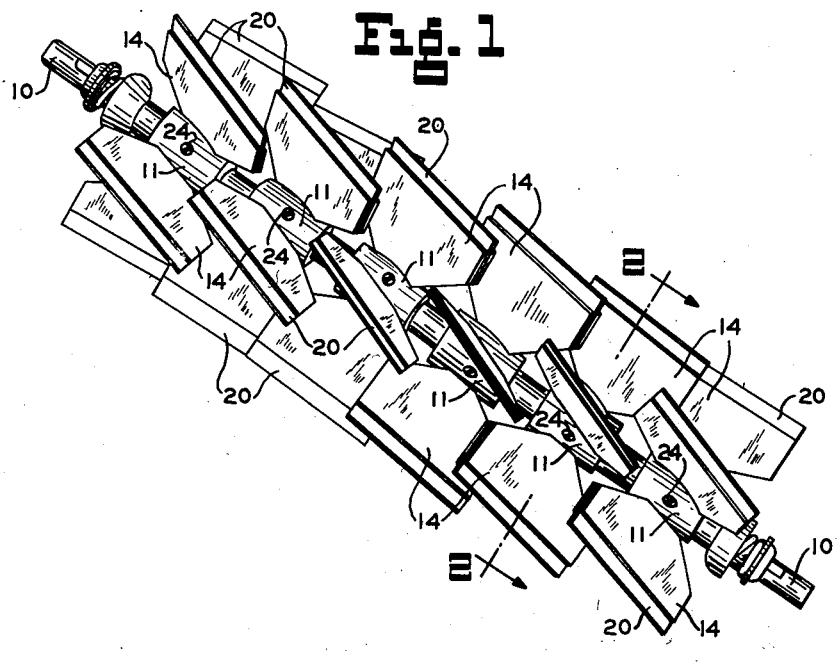
Fig. 1 is a perspective view of a lawn mower shaft showing the position of the blades.
Figure 2:
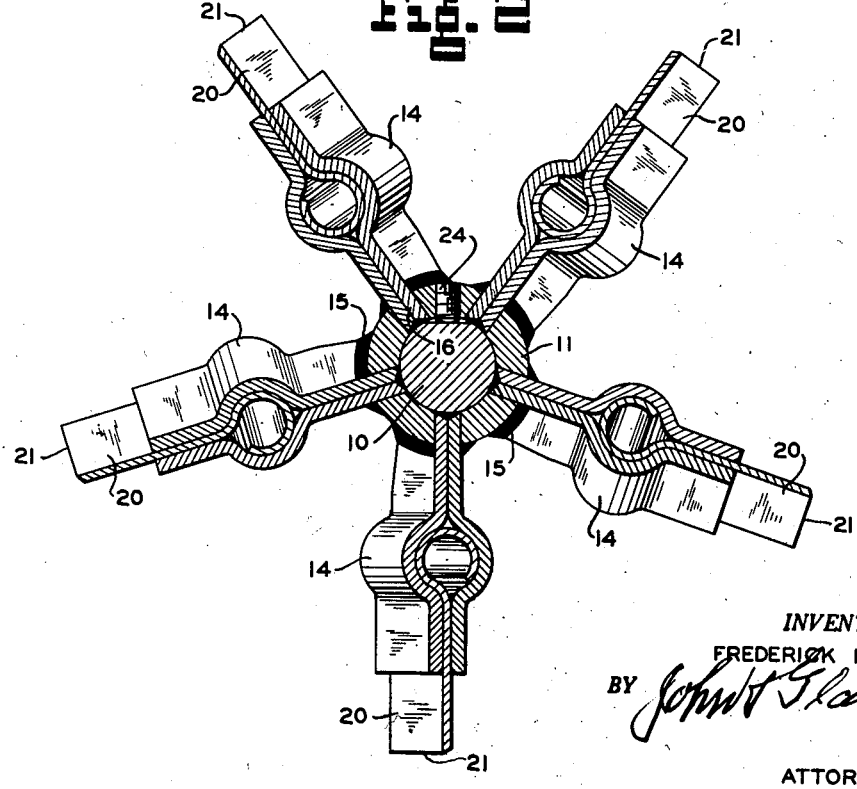
Fig. 2 is an enlarged sectional view taken on the line 2—2 of Fig. 1.

Referring more particularly to the drawings, I provide a shaft 10 which is more or less conventional in the present day lawn mower upon which I mount a series of slotted collars or hubs 11.

In the slots 12 are welded blade holders 14 by means of the weld 15. These blade holders may be made of two pieces of metal welded together at their base 16 but having an open slot 17 at the top and together may form an annular opening 18. I provide a plurality of blade or knife members 20, each of which has a cutting edge 21 and a base 22. The base 22 is formed upon itself to form an annular portion 23 which will have a slight spring or resilience. In assembly the blade holders 14 are welded into the slots 12 and the base of the blades or knives are then compressed slightly so that they may be inserted in the annular section 18 with the cutting portion extending through the slot 17.

It will be appreciated that each blade having been started into the slot 14 can then be tapped into position and will then remain in place due to the springing nature of the base and frictional engagement. Each hub 11 may be provided with a set screw 24 to fasten it on the shaft 10.

The structure just described contemplates a separate hub and blade holder to weld it together. In the form shown in Figs. 4 and 5 the hub or collar 25 may consist of a casting with the central portion 26 engaging the shaft 10 with the said screw 27. Extending from the central portion 26 are arms 28 having knife receiving cavities 29 adapted to receive the knives 20 in the same manner as heretofore described.

It will be appreciated that with my construction knives may be replaced or removed for sharpening without removing the hubs. By the same token the relative position of the hubs and the knives carried by them can be changed to vary the overlap of the area covered by each blade, thus giving a great amount of flexibility.

I claim:

1. In a lawn mower construction a shaft, a hub on said shaft, extensions on said hub constituting blade holders, said blade holders having a pair of arms joined together at their inner ends but spaced apart at their outer ends, said arms being formed to define a cylindrical opening communicating with the spaced portion of said arms and a blade having one end formed in a circular form positioned in the blade holder with the other end of the blade extending beyond said arms, the circular portion of said blade exerting spring pressure against the inside of said arms to position it in place.

2. In a lawn mower construction a shaft, a hub on said shaft, extensions on said hub constituting blade holders, said blade holders having a pair of arms joined together at their inner ends but spaced apart at their outer ends, said arms being formed to define a cylindrical opening communicating with the spaced portion of said arms and a blade having one end formed in a circular form positioned in the blade holder with the other end of the blade extending beyond said arms, the circular portion of said blade exerting spring pressure against the inside of said arms to position it in place, and the circular portion of said blade describing at least a 270° arc.

3. In a lawn mower construction a shaft, a hub on said shaft, extensions on said hub constituting blade holders, said blade holders having a pair of arms joined together at their inner ends but spaced apart at their outer ends, said arms being formed to define a cylindrical opening communicating with the spaced portion of said arms and a blade having one end formed in a circular form positioned in the blade holder with the other end of the blade extending beyond said arms, the circular portion of said blade defining an arc of more than 180° and exerting spring pressure against the inside of said arms to position it in place.

References Cited in the file of this patent
UNITED STATES PATENTS

| | | |
|---|---|---|
| 1,899,439 | Gratiot | Feb. 28, 1933 |
| 2,048,603 | Fancher | July 21, 1936 |
| 2,212,873 | Bobbroff | Aug. 27, 1940 |